G. R. MEYERCORD.
METHOD OF AND APPARATUS FOR GLUING SHEETS EDGE TO EDGE.
APPLICATION FILED FEB. 13, 1920.

INVENTOR:
George R. Meyercord
BY
Chamberlin Freudenreich
ATTORNEYS.

G. R. MEYERCORD.
METHOD OF AND APPARATUS FOR GLUING SHEETS EDGE TO EDGE.
APPLICATION FILED FEB. 13, 1920.

1,418,597.

Patented June 6, 1922.
2 SHEETS—SHEET 2.

INVENTOR.
George R. Meyercord
BY
Chamberlin & Trendenreich
ATTORNEYS.

UNITED STATES PATENT OFFICE.

GEORGE R. MEYERCORD, OF CHICAGO, ILLINOIS, ASSIGNOR TO HASKELITE MANUFACTURING CORPORATION, A CORPORATION OF NEW YORK.

METHOD OF AND APPARATUS FOR GLUING SHEETS EDGE TO EDGE.

1,418,597.                Specification of Letters Patent.      Patented June 6, 1922.

Application filed February 13, 1920. Serial No. 358,454.

*To all whom it may concern:*

Be it known that I, GEORGE R. MEYERCORD, a citizen of the United States, residing at Chicago, county of Cook, State of Illinois, have invented a certain new and useful Improvement in Methods of and Apparatus for Gluing Sheets Edge to Edge, and declare the following to be a full, clear, and exact description of the same, such as will enable others skilled in the art to which it pertains to make and use the same, reference being had to the accompanying drawings, which form a part of this specification.

In manufacturing ply-wood of thin veneers or veneers and thin core layers it has heretofore been the custom not to glue together the abutting edges of the core layers; while pieces of the outer layers have been temporarily fastened together by tapes pasted on one side only of the larger sheets thus formed and just before gluing the sheets together, the joints have been opened by utilizing the tapes as hinges and swinging adjacent pieces relatively to each other.

One of the objects of the present invention is to make it possible effectively to glue together the abutting edges of the pieces in all of the layers of a sheet of ply-wood and to do away with the necessity of using tape and consequently eliminate the item of expense made up of the cost of the tape and the cost of applying and subsequently removing the tape.

In making glued butt joints it is necessary that the abutting edges be brought into intimate contact with each other, that the pieces or strips of veneer be in perfect registration in order that the finished sheet have smooth unbroken surfaces, and that if there are irregularities or imperfections in the edges of pieces or strips the necessary intimate contact between edges may still be obtained. In one of its aspects my invention may be said to have for its object to produce a simple and novel method of and apparatus for quickly and easily gluing together the edges of pieces or strips of veneer or other material which will insure fulfillment of the conditions just named.

Another disadvantage in or objection to the old processes of manufacturing ply-wood has been the limitation as to the size of the sheets which it was practicable to build, thus involving much trimming and waste in cutting down each panel to some definite size. A further object of the present invention is to produce a simple and novel method of and apparatus for quickly and conveniently gluing together pieces of veneer or the like edge to edge in such a manner that sheets of any desired length may be formed by adding pieces to one end of the work and feeding the work ahead as its length increases; so that shorter sheets or subsequently formed panels may be produced by simply severing sections from a long sheet or panel.

Another desirable thing in the manufacture of ply-wood is that the veneer be quite dry at the time of gluing. Usually the veneer goes through at least two drying processes before being glued, first by the manufacturer of the veneer and then by the manufacturer of the ply-wood. In carrying out my invention in connection with albumen glue which must be set by heat, I am enabled to heat the veneer for a considerable length of time during the edge-gluing and therefore, considered in one of its aspects, my invention may be said to have for its object simultaneously to glue pieces of veneer edge to edge and dry them so as to reduce the time required for a special drying operation or eliminate the latter altogether.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1:
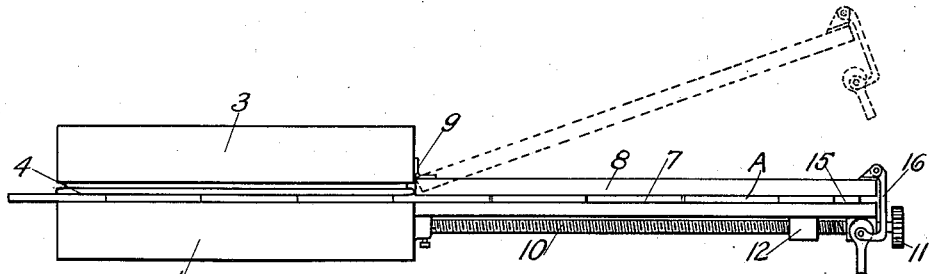
Figure 1 is a side elevation of one form of machine constructed and arranged to carry out the present invention.
Figure 2:
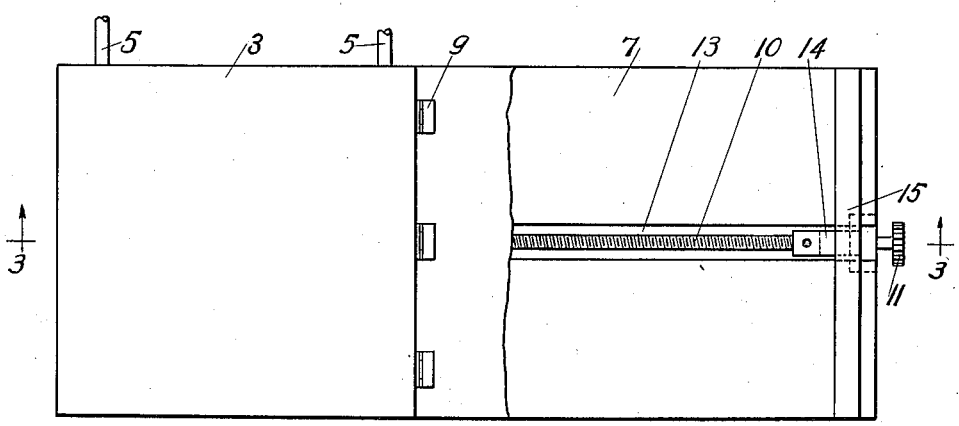
Fig. 2 is a top plan view of the machine shown in Fig. 1, a portion of the movable cover above the work-supporting table being broken away.
Figure 3:
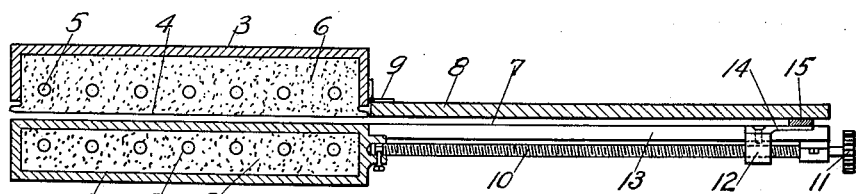
Fig. 3 is a section taken approximately on line 3—3 of Fig. 2.

In order to produce a successful glued joint between the abutting edges of two pieces of wood veneer it is necessary that the edges be pressed firmly together and be held in this condition until the glue has set. It is of course possible to clamp the work so as to hold it stationary during the time the glue is setting but, if the work can be kept in motion during the gluing process, the time which would otherwise be employed simply for the purpose of feeding the work can be saved. In accordance with my invention, two pieces of veneer which are to be glued together have glue applied to one or both of the contacting edges and they are then fed forward through a yielding clamping mechanism by a force or forces applied to the rearmost piece in a direction causing it to push the piece in advance of it ahead; the clamping mechanism exerting only sufficient pressure on the work to insure the proper pressure at the joint in the direction of feed as the work is pushed ahead against the frictional resistance produced by the clamping mechanism. The clamping mechanism not only provides the necessary resistance to the advance of the work, but it holds the pieces in registration with each other so that if they be of uniform thickness the resulting sheet will present smooth unbroken surfaces. By heating the clamping mechanism and making it of sufficient length, one piece after another may be added at the rear end of the work as the work is moving uninterruptedly ahead, the setting of each joint being completed and the veneer being dried while the work is traveling through the clamping mechanism.

In the arrangement shown in the first three figures of the drawings, 1 represents a hollow table heated by internal steam pipes, 2. Above the table is a box, 3, preferably of the same length and width as the table, having a yieldable or flexible bottom, 4. Within the member 3 are heating coils, 5. Both the interior of the table and the box may be filled with sand, 6, or other fluid heat-conducting material which not only conveys heat to the top of the table and the bottom wall of the box, but produces a yielding downward pressure on the latter. At one side of the table is a work-supporting shelf or platform, 7, having its top lying in the same plane as the top of the table. Above the member 7 is a movable cover plate, 8, which may conveniently be hinged at its inner end, as indicated at 9, to the adjacent end of the box 3. Below the shelf or platform, 7, is a screw shaft, 10, provided at its outer end with any suitable actuating device, 11; the inner end of the shaft extending into the vicinity of the hollow table. On the shaft is a nut, 12, which extends upwardly into a slot, 13, cut through the platform directly above and extending throughout the length of the screw shaft. An arm or bracket, 14, is attached to the nut so as to be capable of swinging around a vertical axis and to this arm or bracket is fastened a flat bar, 15, which rests upon the platform and extends across the latter in a direction transverse to the screw shaft. The member 15 has a thickness approximately equal to the thickness of the veneer to be glued.

A suitable clamp, 16, may be provided for holding the cover or plate, 8, down in a position parallel with the top of the platform and table.

In using the machine, the cover, 8, is first swung up out of the way and the platform is covered with a layer of pieces of veneer, as indicated at A in Fig. 1, having glue applied to their meeting edges; the cover is then swung down and clamped and the screw shaft is turned in a direction to carry the nut and consequently the bar, 15, toward the hollow table. The result is that the bar, 15, engages the outer edge of the outermost piece of veneer and pushes that piece ahead until it presses firmly against the outer edge of the next piece and forces that piece ahead. In this way all gaps between the pieces are closed up and that piece farthest in advance enters between the table and the flexible wall, 4, above the latter. As the shaft continues to rotate, the work is slowly fed ahead until the first joint enters the heated zone where, as the feeding of the work continues, the combined heat and pressure completely set the joint above the same, before it passes out from between the table and the flexible wall above the same at the opposite end of the machine. It will be understood that the flexible wall of the box overlying the table is spaced apart such a distance from the top of the table that this wall rests upon the veneer and creates a frictional resistance great enough to insure the desired pressure at the joints in the direction in which the work is being fed. One joint after the other reaches the table and passes across the same until the platform has been emptied. The bar is then brought back to the starting point, the cover is lifted, and a new supply of pieces is laid on the platform, the foremost piece of the new supply having its advance edge coated with glue so that when the process just described is repeated, the first piece of the new supply will be glued to the rear end of that part of the sheet already formed. In this way a sheet of any desired length may be formed by progressively building it up at one end and feeding it forward as it increases in length.

It will be seen that by connecting the bar, 15, to the driving nut in such a way that the bar can swing, at least within limits, about a vertical axis, an even distribution of pressure can be secured throughout the length of a joint even though each piece of veneer is not of exactly the same width at one end as at the other but tapers somewhat; the bar automatically adjusting itself to the work.

Figure 4:
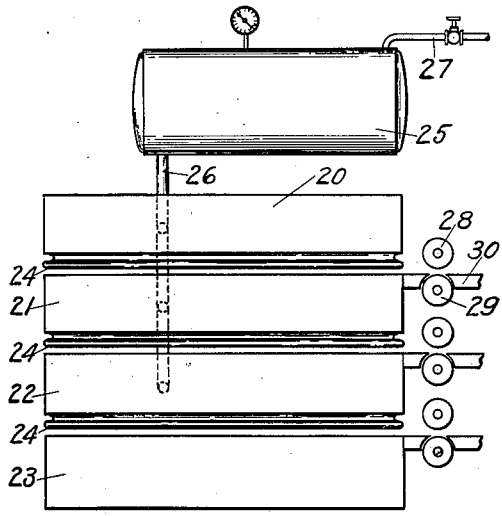
Fig. 4 is a side view of a modified form of machine.
Figure 5:
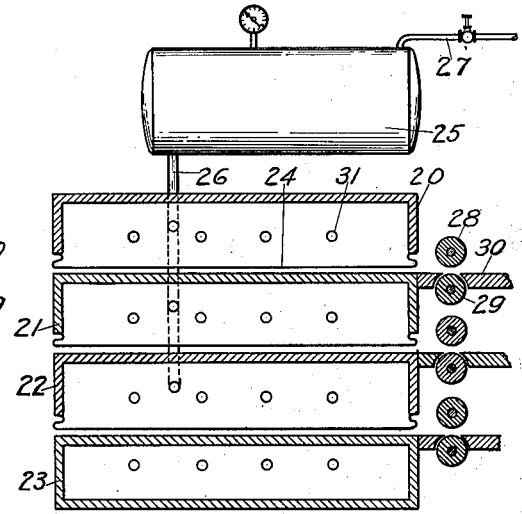
Fig. 5 is a vertical longitudinal section through the machine shown in Fig. 4.
Figure 6:
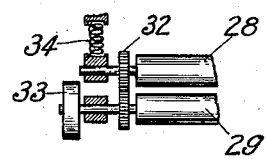
Fig. 6 is a detail of the supporting bearing for one end of a pair of feed rolls, showing also the driving connection between the rolls.

While the machine or apparatus just described permits the work to be fed constantly in one direction, it makes the process intermittent to the extent that the feeding of the work is arrested when and during the time a new supply of material is placed on the delivery platform. In Figures 4, 5 and 6 I have illustrated an arrangement which permits the process to be entirely continuous, no interruption of the feed being required to permit the delivery of the addition or insertion of pieces of veneer. Referring to these latter figures of the drawings, 20, 21, 22 and 23 represent hollow tables or boxes, the last three of which have rigid plane tops while the first three have flexible bottoms, 24, similar to the flexible bottom of the box in the machine heretofore described. The interior of the members 20 to 22 inclusive is preferably filled with any fluid or fluid-like material which may conveniently be water or oil under pressure. In the arrangement shown, there is a reservoir, 25, for the liquid, the bottom of the reservoir being connected to the interiors of the members 20, 21, and 22, through a suitable pipe or header, 26. If desired, there may be a pipe, 27 leading into the top of the reservoir from a source of supply of compressed air so as to permit the pressure in the system to be regulated in a simple and convenient manner. The work is fed into the space between the top of each of the tables, 21, 22 and 23, and the flexible bottom of the overlying member, by means of suitable feed rolls arranged in pairs, as indicated at 28 and 29. In advance of each pair of feed rolls there may be a receiving platform, 30, on which one piece of veneer after another may be laid and, when moved between the feed rolls will be fed by the latter across the tables. Glue is applied to the edges of the pieces of veneer as heretofore explained, so that pressure is maintained at all of the joints in the work lying on the tables and being pushed ahead by that piece of veneer which happens to be gripped at the time by the corresponding feed rolls; this pressure being due to the resistance encountered by the work in overcoming the friction between the work, the top of the table, and the overlying flexible wall. As in the other machine or apparatus, the tables or boxes, 20 to 23, are preferably heated as, for example, by means of suitable steam coils, 31. The process, as it may be practiced in this machine, is a continuous one and all that the operator has to do is to deliver pieces of veneer to the feed rolls.

The feed rolls of each pair may of course be driven in any suitable way. The rolls of each pair are preferably driven at the same speed which may be accomplished by connecting them together with gearing, as indicated at 32 in Fig. 6. One roll of each pair may be the driving roll and be in turn driven in any suitable manner as, for example, from a pulley, 33. The other roll is preferably supported in bearings containing a spring or springs, 34, which will permit it to move somewhat away from the co-operating roll so as to compensate for variations in the thickness of the veneer.

Figure 7:
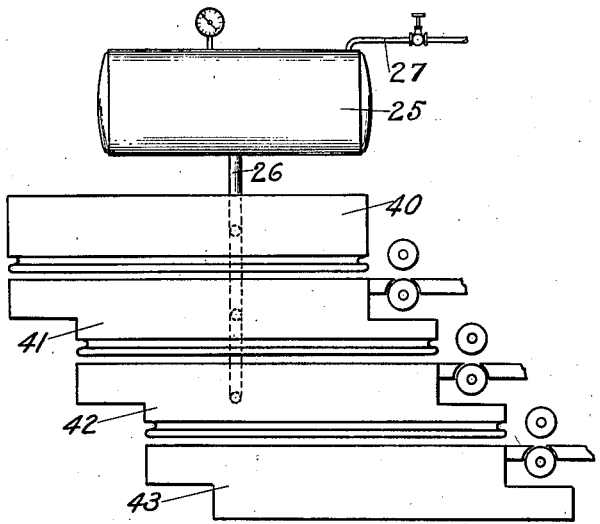
Fig. 7 is a view similar to Fig. 4, illustrating a modification of the machine shown in the latter figure.

In Fig. 7 I have illustrated an arrangement similar to that shown in Figs. 4, 5 and 6 except that the boxes or tables, 40, 41, 42 and 43, corresponding to the members 20 to 23 respectively, in the other form, are offset in the direction of feed of the work so that the several pairs of guide rolls do not lie directly above each other but are arranged in step form, the purpose being to provide somewhat better working conditions at the lower tables than where the feed rolls are all arranged in a single vertical row.

In each instance the edges to be joined are pressed into contact with each other by the forces which feed the work and during the time the work is moving, so that there is no time lost as would be the case if the work had to be clamped in a stationary position to bring the edges of the veneer together and hold them in that condition while the glue is setting. Furthermore, my invention permits the frictional resistance between the work and the yieldable gripping or clamping means to be regulated and thus insure that there will be just the right amount of pressure at the joints; it permits the pressure to be evenly distributed even though the pieces of veneer be not all of exactly the same thickness; it insures proper registration of the pieces or strips of veneer; and it brings about a drying of the veneer.

While I have explained my improved process in connection with several mechanisms or machines which may be used advantageously in carrying out my method, I do not desire to be limited to the specific construction of such mechanisms or machines; but intend to cover a method and machine as defined in the definitions of my invention constituting the appended claims.

I claim:

1. The method of gluing a plurality of pieces edge to edge which consists in applying glue to the edges to be joined, laying the pieces in contact with each other, pushing the pieces through a yieldable stationary clamping or holding device in a manner to transmit the moving force from each piece to the piece in advance in a direction tending to press together the abutting edges between such pieces, and heating the clamping device to set the glue.

2. The method of gluing a plurality of pieces edge to edge which consists in applying glue to the edges to be joined, yieldingly clamping the pieces so as to produce a frictional resistance on opposite faces thereof to movement of the pieces in the direction of the length of the compound sheet and transverse to the joints, applying a force to the rearmost piece of a group sufficient to push said group ahead in the aforesaid direction, and applying heat to the work while it is being held.

3. An apparatus for producing butt joints between the edges of pieces of veener or the like comprising a table, a pressure device above the table yieldable in the vertical direction and held against movement across the table, means for pushing a plurality of pieces having glue between their contacting edges across the table and underneath said pressure device, and means for heating said table and said pressure device.

4. An apparatus for producing butt joints between the edges of pieces of veneer or the like, comprising a table, a flexible sheet of metal arranged above the table and adapted to lie upon the work resting on the table, means for producing a uniformly-distributed downward pressure on said sheet, and means for feeding work between the sheet and the table.

5. An apparatus for producing butt joints between the edges of pieces of veneer or the like, comprising a table, a box above the table, said box having a flexible bottom, means for creating a pressure in said box, and means for feeding the work between the flexible bottom of the box and said table.

In testimony whereof, I sign this specification.

GEORGE R. MEYERCORD.